United States Patent
Liu et al.

(10) Patent No.: US 7,615,754 B2
(45) Date of Patent: Nov. 10, 2009

(54) COMPACT CMOS-BASED X-RAY DETECTOR ADAPTED FOR DENTAL APPLICATIONS

(75) Inventors: XinQiao Liu, Mountain View, CA (US); Boyd Fowler, Sunnyvale, CA (US)

(73) Assignee: Fairchild Imaging, Inc., Milpitas, CA (US)

( * ) Notice: Subject to any disclaimer, the term of this patent is extended or adjusted under 35 U.S.C. 154(b) by 262 days.

(21) Appl. No.: 11/683,535

(22) Filed: Mar. 8, 2007

(65) Prior Publication Data

US 2008/0217545 A1 Sep. 11, 2008

(51) Int. Cl.
*G01T 1/20* (2006.01)
(52) U.S. Cl. .................................. 250/370.09
(58) Field of Classification Search ............. 250/370.09
See application file for complete search history.

(56) References Cited

U.S. PATENT DOCUMENTS

| | | | |
|---|---|---|---|
| 5,336,879 A * | 8/1994 | Sauer | 250/208.1 |
| 5,434,418 A | 7/1995 | Schick | |
| 5,461,425 A | 10/1995 | Fowler et al. | |
| 5,818,900 A * | 10/1998 | Vogelsong et al. | 378/62 |
| 5,834,782 A | 11/1998 | Schick et al. | |
| 5,852,647 A | 12/1998 | Schick et al. | |
| 5,898,753 A | 4/1999 | Schick et al. | |
| 5,908,294 A | 6/1999 | Schick et al. | |
| 5,912,942 A | 6/1999 | Schick et al. | |
| 5,995,583 A | 11/1999 | Schick et al. | |
| 6,069,935 A | 5/2000 | Schick et al. | |
| 6,134,298 A | 10/2000 | Schick et al. | |
| 6,424,375 B1 | 7/2002 | Fowler | |
| 6,761,561 B2 | 7/2004 | Mandelkern et al. | |
| 6,765,619 B1 | 7/2004 | Deng et al. | |
| 6,908,307 B2 | 6/2005 | Schick | |
| 6,924,486 B2 | 8/2005 | Schick et al. | |
| 6,972,411 B2 | 12/2005 | Schick et al. | |
| 2006/0071174 A1 | 4/2006 | Spartiotis et al. | |

* cited by examiner

*Primary Examiner*—Constantine Hannaher
*Assistant Examiner*—Mark R Gaworecki
(74) *Attorney, Agent, or Firm*—Calvin B. Ward (57) ABSTRACT

An image sensor having a two-dimensional array of pixel sensors, a layer of scintillation material, and a controller is disclosed. The layer of scintillation material is adjacent to the two-dimensional array, the scintillation material emits light in response to x-rays impinging thereon. The pixel sensors detect this light. The controller reads out data stored in the two-dimensional array of pixel sensors and forms an image therefrom. The controller corrects the data for errors resulting from x-rays that generate electrons that are stored in the pixel sensors in the process of forming the image. In one aspect of the invention, the controller forms the image by causing the two-dimensional array to form a plurality of frames, each frame includes a measurement of a charge stored on each photodiode during a preceding time period. The controller selectively combines data from the frames to form the image.

11 Claims, 8 Drawing Sheets

COMPACT CMOS-BASED X-RAY DETECTOR ADAPTED FOR DENTAL APPLICATIONS

BACKGROUND OF THE INVENTION

Dental x-rays are typically taken with a film that is placed in the patient's mouth. The film is exposed through the teeth by an x-ray source that resides outside the patient's head. While this method has been in use for many years, it has its disadvantages. First, the patient is exposed to a significant dose of x-rays. This dose is accumulative over the patient's lifetime. Second, the time, cost, and equipment needed to process the film increases the cost of the dental examination. Third, the chemicals utilized in processing the film pose a disposal problem.

These problems have led to several attempts to replace the film component of the traditional x-ray examination with a solid-state sensor that is placed in the patient's mouth to record the x-ray image. In such systems, a layer of scintillation material is used to convert the x-rays to visible light. The visible light is then imaged onto a solid-state imaging array. Since solid-state x-ray sensors of this type are significantly more sensitive to x-rays than the films utilized today, the x-ray dosage can be reduced, typically, by a factor of 10. In addition, the sensor is re-used, and hence, the cost and disposal problems associated with the conventional x-ray system are avoided. Finally, since the image is in digital form, systems based on solid-state sensors are easily adapted to paperless office systems.

Unfortunately, these sensors are much thicker than the conventional film based sensors and the resolution of the sensors is also less than that of conventional film-based sensors. The sensors include a channel plate between the scintillation material and the image-recording element, which is typically a silicon-based imaging array. When an x-ray is converted in a pixel of the imaging array, the resultant signal can be much greater than the signal produced by the light from the scintillator. The probability of such a conversion event is small, and hence, the x-ray hits result in scattered bright pixels in the image that render the image objectionable. To reduce these events, a layer of shielding material that transmits the light from the scintillator to the imaging array is used. The shielding layer typically consists of a bundle of optical fibers that images the surface of the scintillator onto the surface of the imaging array. The optical fibers are doped with a heavy metal that absorbs x-rays that are not converted in the scintillation material. The shielding layer blocks most of the x-rays from reaching the image sensor, and hence, reduces the number of bright pixels to an acceptable level.

While the shielding layer solves the bright pixel problem, it introduces new problems. The shielding plate is typically greater than 2.5 mm in thickness, and hence, significantly increases the thickness of the apparatus that is placed in the patient's mouth. The increased thickness is objectionable to many patients.

SUMMARY OF THE INVENTION

The present invention includes an image sensor having a two-dimensional array of pixel sensors, a layer of scintillation material, and a controller. The layer of scintillation material is adjacent to the two-dimensional array, the scintillation material emitting light in response to x-rays impinging thereon. The pixel sensors detect this light. The controller reads out data stored in the two-dimensional array of pixel sensors and forms an image therefrom. The controller corrects the data for errors resulting from x-rays that generate electrons that are stored in the pixel sensors in the process of forming the image. In one aspect of the invention, the controller forms the image by causing the two-dimensional array to form a plurality of frames, each frame includes a measurement of a charge stored on each photodiode during a preceding time period. The controller combines data from the frames to form the image. In another aspect of the invention, each of the pixel sensors includes a photodetector that stores a charge in response to the light that is received by that photodetector, a reset circuit, and an interface that connects that pixel to the controller in response to commands generated by the controller. The reset circuit resets the photodetectors by causing a predetermined potential to be coupled to the photodetector. In another aspect of the invention, the controller causes the reset circuits to reset the photodetectors at the end of each frame. In yet another aspect of the invention, the controller identifies pixels in which the stored charge is greater than a threshold value. The data from these pixels is not utilized in forming the corrected image.

DETAILED DESCRIPTION OF THE PREFERRED EMBODIMENTS

Figure 1:
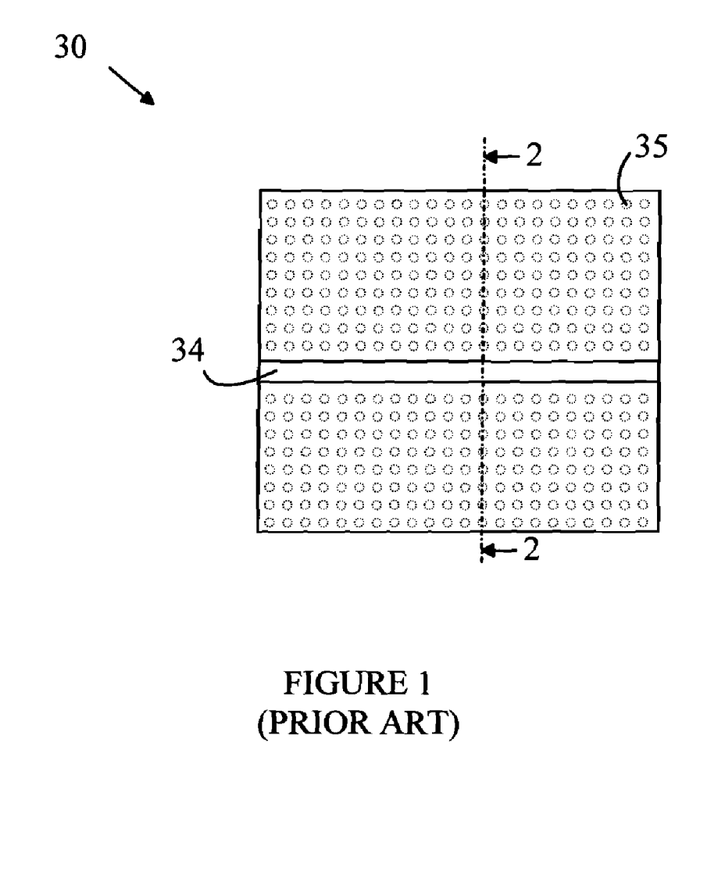
FIG. 1 is a top view of prior art dental sensor 30.
Figure 2:
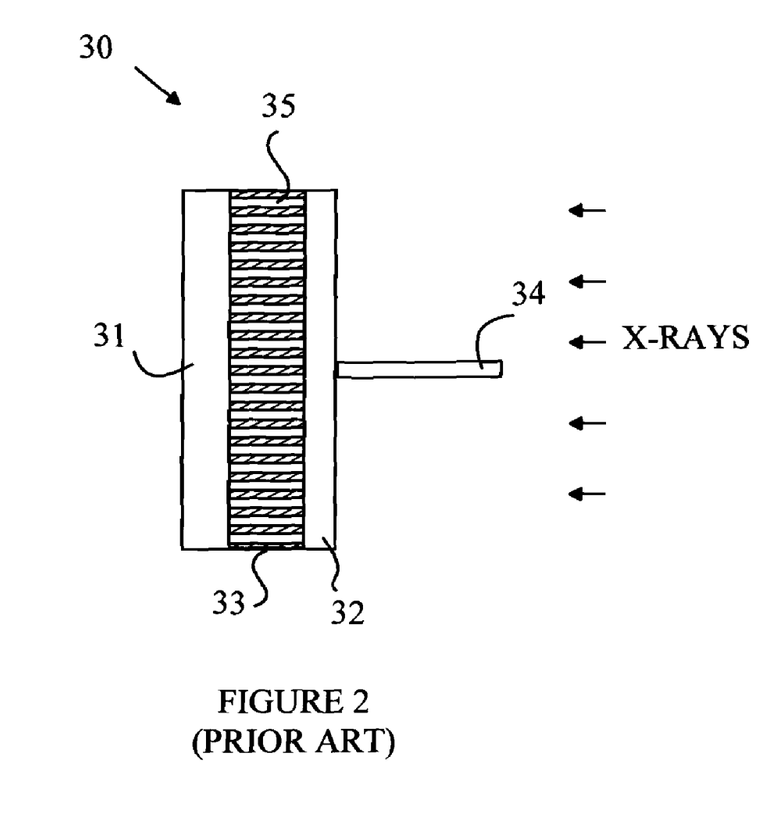
FIG. 2 is a cross-sectional view through line 2-2 shown in FIG. 1.

The manner in which the present invention provides its advantages can be more easily understood with reference to FIGS. 1 and 2, which illustrate a prior art dental sensor. FIG. 1 is a top view of dental sensor 30, and FIG. 2 is a cross-sectional view through line 2-2 shown in FIG. 1. Dental sensor 30 includes a layer 32 of scintillation material that converts x-rays to light in the visible region of the spectrum. The light generated in layer 32 is viewed by an image sensor 31 through a channel plate 33 that consists of a bundle of optical fibers that map the surface of the scintillation material onto image sensor 31. Sensor 30 is placed inside the patient's mouth and held in place by the patient biting down on tab 34. When x-rays from a source outside the mouth impinge on sensor 30 after passing through the patient's teeth, the x-rays strike layer 32. Each interaction between an X-ray and the material of layer 32 results in a photon being generated. The photons are emitted in all directions. Channel plate 33 blocks photons that are traveling in directions other than that defined by the aperture of the optical fibers shown at 35. Channel plate 33 is made primarily of glass fibers. The metal doped glass absorbs x-rays that escape from the scintillation layer without being converted. The thickness of the glass is chosen such that the number of x-rays that reach sensor 31 is reduced to the point that interactions between the x-rays and the pixels in sensor 31 are rare.

Figure 3:
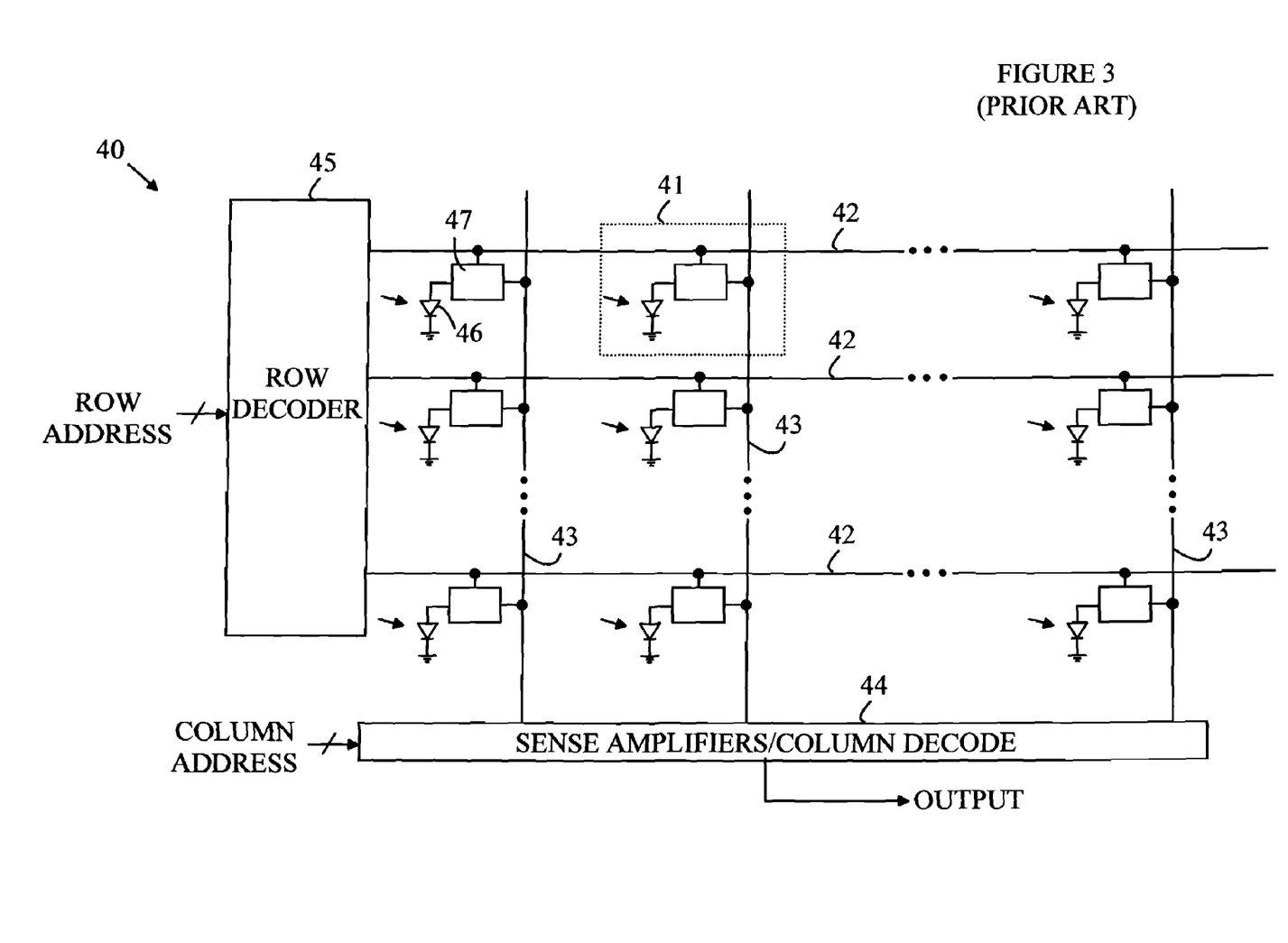
FIG. 3 is a schematic drawing of a prior art CMOS imaging array of the type normally used with dental sensor 30.

Refer now to FIG. 3, which is a schematic drawing of a prior art CMOS imaging array of the type normally used with dental sensor 30. Imaging array 40 is constructed from a rectangular array of pixel sensors 41. Each pixel sensor includes a photodiode 46 and an interface circuit 47. The details of the interface circuit depend on the particular pixel design. However, all of the pixel sensors include a gate that is connected to a row line 42 that is used to connect that pixel sensor to a bit line 43. The specific row that is enabled at any time is determined by a bit address that is input to a row decoder 45. The row select lines are a parallel array of conductors that run horizontally in the metal layers over the substrate in which the photodiodes and interface circuitry are constructed.

The various bit lines terminate in a column processing circuit 44 that typically includes sense amplifiers and column decoders. The bit lines are a parallel array of conductors that run vertically in the metal layers over the substrate in which the photodiode and interface circuitry are constructed. Each sense amplifier reads the signal produced by the pixel that is currently connected to the bit line processed by that sense amplifier. The sense amplifiers may generate a digital output signal by utilizing an analog-to-digital converter (ADC). At any given time, a single pixel sensor is readout from the imaging array. The specific column that is readout is determined by a column address that is utilized by a column decoder to connect the sense amplifier/ADC output from that column to circuitry that is external to the imaging array.

When a photon from scintillator 32 strikes the photodiode in one of the pixels, at most one electron is moved across the diode junction. The electron charge is stored in the pixel and the cumulative stored charge is then readout when the pixels are readout. In contrast, when an x-ray is scattered from an electron in one of the photodiodes, the electron generates an ionized track in the photodiode that causes a number of electrons to move across the junction. In general, the charge stored by a single x-ray hit is much larger than the charge stored from photons generated in the scintillator during the x-ray exposure. Hence, a single x-ray hit can produce a pixel having an apparent intensity that is much brighter than the pixels that did not receive such a hit. As a result, the image appears to have scattered very bright pixels overlaid on the normal x-ray image. As noted above, channel plate 33 is used to reduce the number of such bright pixels. However, to be effective in this regard, the thickness of channel plate 33 must be sufficient to absorb a significant fraction of the x-rays that pass through scintillator 32. As a result, the channel plate represents a substantial fraction of the thickness of sensor 30. The added thickness is objectionable to many patients. In addition, the channel plate only partially corrects for the reduction in image resolution that results from moving sensor 31 away from scintillator 32. The image spatial resolution is further degraded due to light scattering at the interface between scintillator 32 and channel plate 33 and at the interface between channel plate 33 and detector 31.

Figure 4:
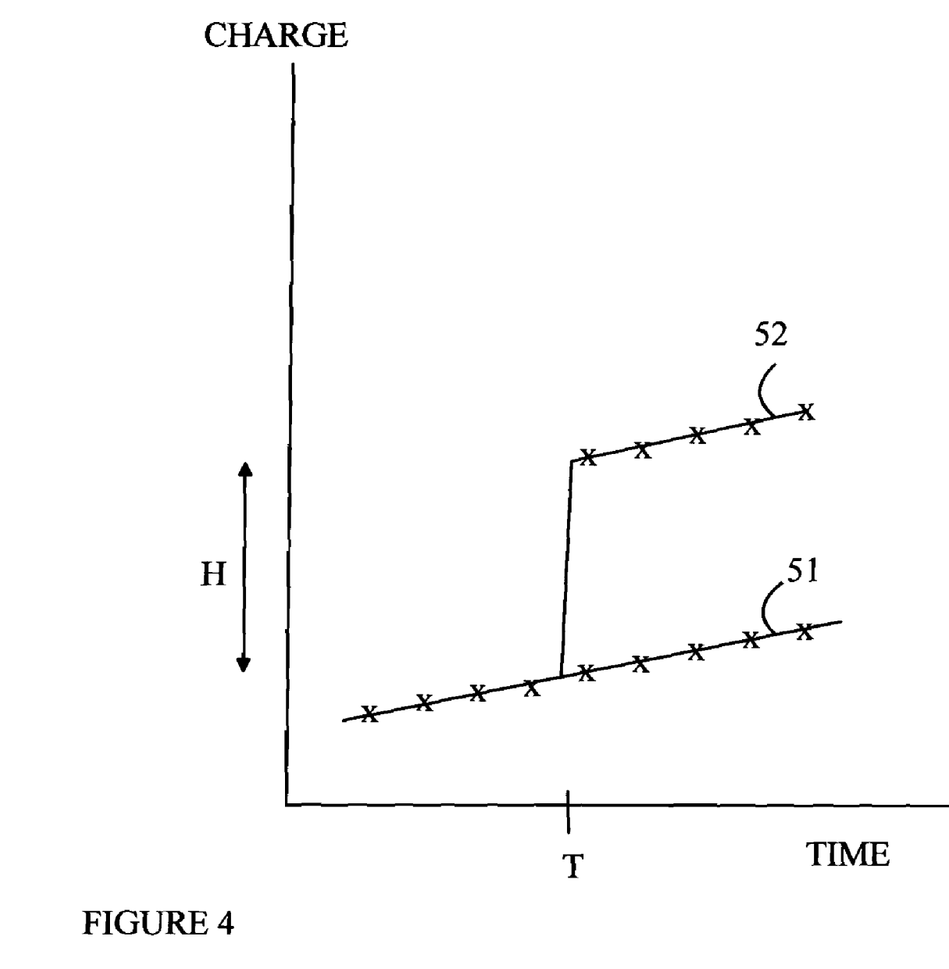
FIG. 4 illustrates charge generated by a pixel as a function of time.

One embodiment of the present invention is based on the observation that an x-ray strike in the image sensor can be identified and corrected if the charge on a pixel is measured as a function of time. Refer now to FIG. 4, which illustrates charge generated by a pixel as a function of time. Curve 51 represents the normal charge buildup due to photons received from the scintillator. Curve 52 shows the charge buildup as a function of time when an x-ray is converted in the pixel at time T. If the charge is measured as a function of time as shown by the points marked "x" the existence of the x-ray strike can be noted and the signal value represented by H subtracted from the final value.

If the speed of the image sensor readout and reset is sufficiently high, a number of individual images could be made during the x-ray exposure. The charging curve of each pixel could then be measured and analyzed for a step corresponding to an x-ray hit. This embodiment, however, requires a very fast image sensor readout. In this regard, it should be noted that the image sensor readout in the embodiment shown in FIG. 3 must perform N readout cycles that are determined by the time needed to propagate the signal from the pixel to the sense amplifiers at the bottom of each column of pixels and to digitize the signal. Here, N is the number of rows of pixels in the image.

Figure 5:
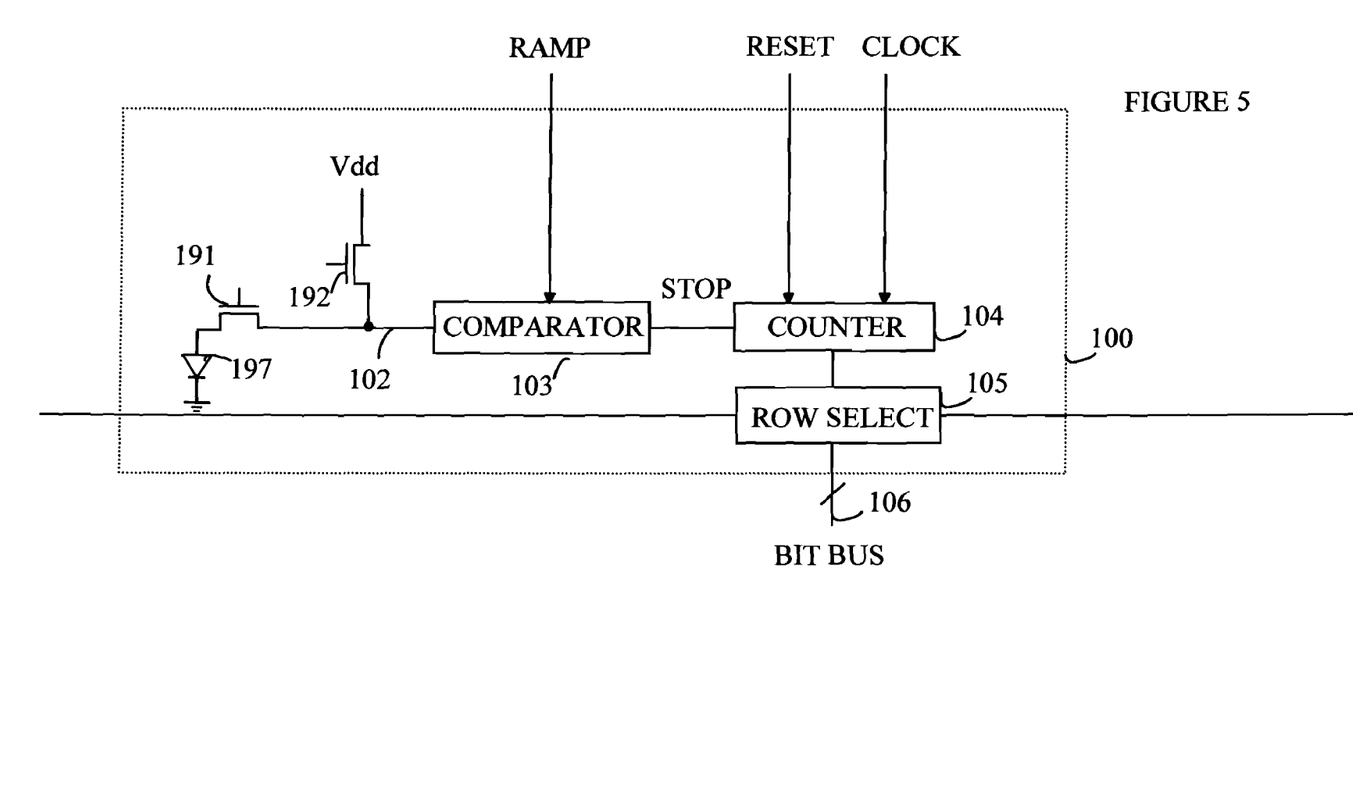
FIG. 5 is a schematic drawing of a pixel sensor that utilizes a distributed ADC according to one embodiment of the present invention.

One method for improving the readout speed is to include an analog to digital converter in each image pixel. Refer now to FIG. 5, which is a schematic drawing of a pixel sensor that utilizes a distributed ADC according to one embodiment of the present invention. Pixel sensor 100 includes a photodiode 197 that is connected to a transfer gate 191 and a reset transistor 192 that operate in a manner analogous to that described above. After the pixels in the array containing pixel sensor 100 have been exposed, the charge on each of the photodiodes is digitized. At the start of the digitization process, the charge stored on photodiode 197 is coupled to node 102 by applying a signal to gate 191. The counter is then reset and begins to count clock pulses while the potential on the other input of the comparator 103 is increased. The potential on the ramp line is linearly related to the count that has accumulated in counter 104. When the ramp potential is equal to the potential at node 102, the comparator 103 generates a stop signal that is applied to counter 104. Hence, counter 104 is left with a count that is related to the potential at node 102. After all of the pixels have been digitized in this manner, the pixels are readout one row at a time using a row decoder that operates a set of row select switches 105 that connect the counter output to a bit bus 106, which serves a function analogous to the bit lines described above, albeit the signal on the bit line is in digital format instead of the analog format described above. In this embodiment, the bit bus includes one line per bit in counter 104. Hence, the counter is readout in parallel down bit bus 106. While this embodiment utilizes a bit bus that reads out the counter bits in parallel, embodiments in which the bits in the counter are shifted down a single conductor bit line can also be constructed.

Figure 6:
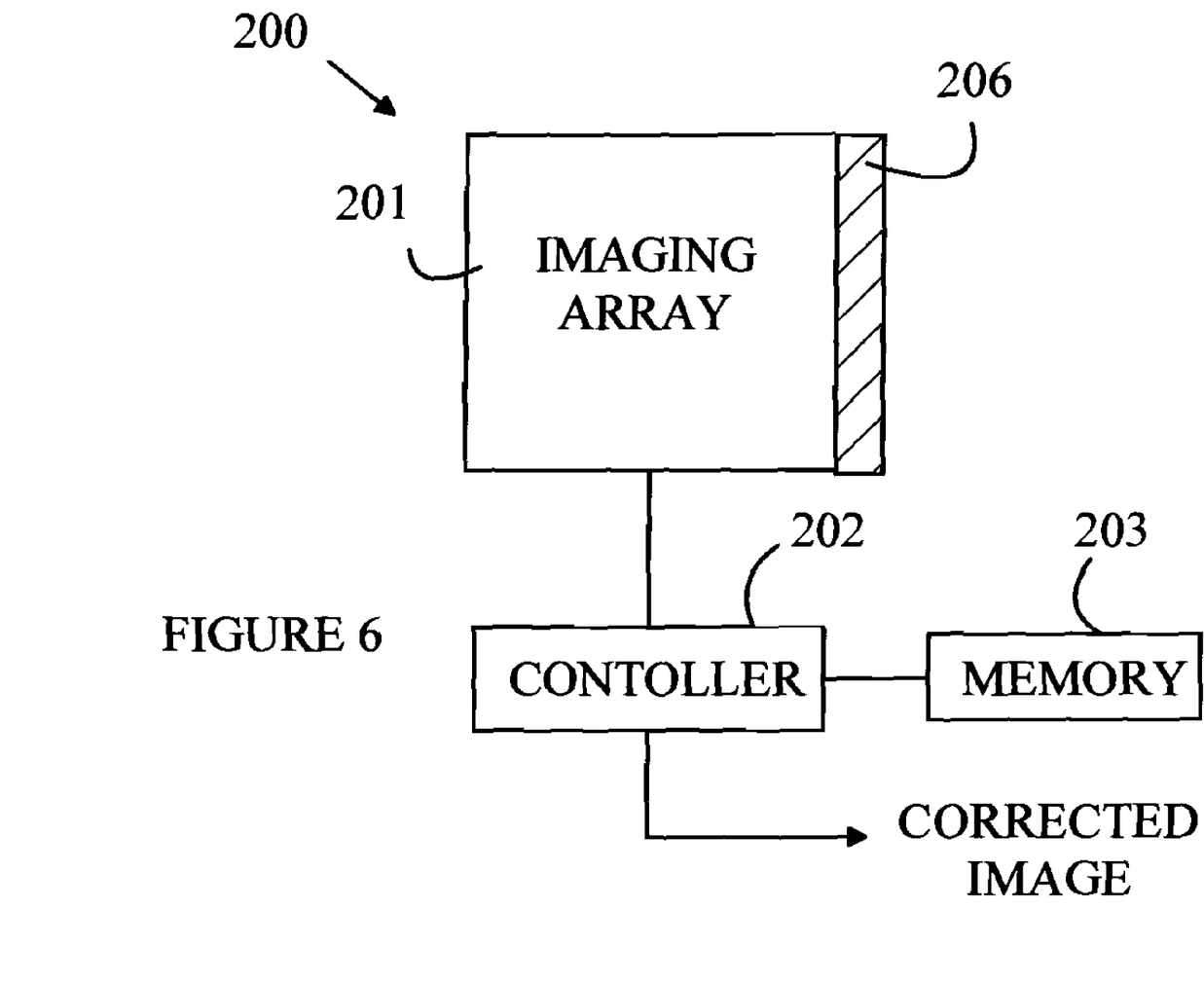
FIG. 6 illustrates a dental imaging system according to one embodiment of the present invention.

It should be noted that all of the data stored as an analog charge in the pixels is digitized at the same time; hence, the analog-to-digital conversion of the data is reduced to the time needed to readout one row in the prior art embodiments. In addition, the pixels need not be reset after each readout operation, and hence, the charge continues to accumulate on each photodiode. Accordingly, only one reset time is needed for each x-ray image. Refer now to FIG. 6, which illustrates a dental imaging system according to one embodiment of the present invention. Imaging system 200 includes an imaging array 201 that forms an image from the light generated in the scintillator 206 by the conversion of x-rays. The scintillator includes a layer of material that converts x-rays to light in a wavelength band to which imaging array 201 is sensitive. The layer of material is preferably adjacent to imaging array 201 with as little intervening material as possible.

A controller 202 collects a number of images during the x-ray exposure. Each image will be referred to as a frame in the following discussion. Controller 202 keeps a cumulative image in a memory 203 that is updated each time a frame is received by controller 202. In one embodiment, controller 202 also keeps a count for each pixel in the cumulative image. The count keeps track of the number of frames that have contributed to that pixel. The count is used to correct the pixels that have been altered by x-ray hits.

The manner in which controller 202 processes the individual frames depends on whether or not the imaging array is reset between frames. In one embodiment, imaging array 201 is reset after each frame. Hence, each pixel in a frame represents the charge accumulated from that pixel during the exposure of the imaging array frame. In this case, a pixel that has suffered an x-ray hit will have significantly more charge than the other pixels in the frame that received roughly the same number of photons from the scintillator but did not suffer such a hit. Also, a pixel that has suffered an x-ray hit during the current frame exposure will have significantly more charge than the charge collected by the same pixel during previous no x-ray hit frames as well as later no x-ray hit frames. If the maximum charge variation (due to noise) from light photons created in the scintillator between frames is known, those pixels that suffered an x-ray hit during a particular frame can easily be identified by looking for pixels that have charge difference with previous and later frames greater than some maximum value, $D_{max}$.

Figure 7:
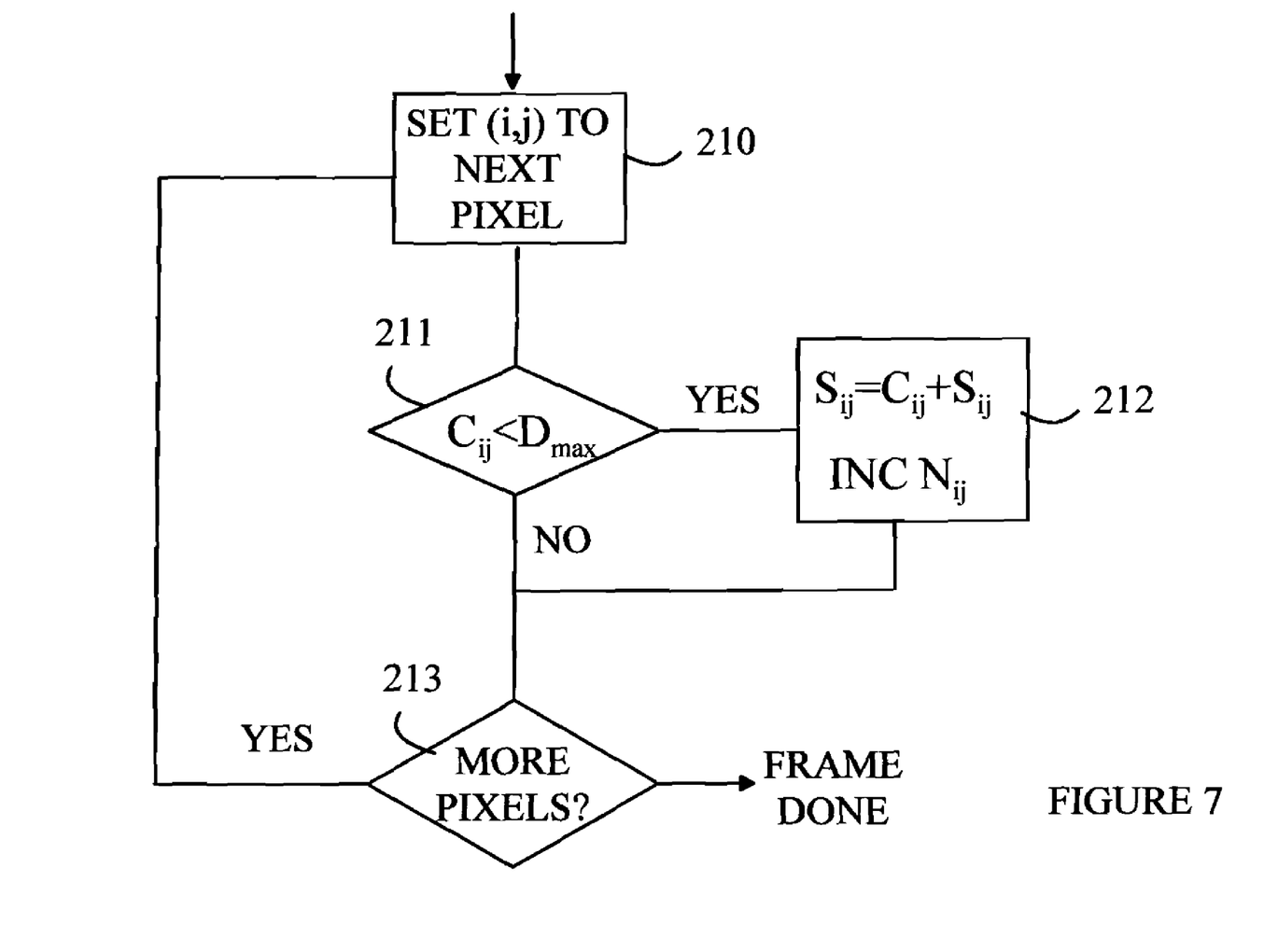
FIG. 7 is a flow chart of the algorithm executed by the controller when a new frame is received.

Denote the pixels of the new frame by $C_{ij}$ and the pixels of the image stored in memory 203 by $S_{ij}$. The number of rows and columns in the image sensor will be denoted by $N_x$ and $N_y$, respectively. In addition to the $S_{ij}$, memory 203 also stores an array $N_{ij}$ whose function will be discussed in more detail below. At the start of the x-ray imaging process, $S_{ij}=N_{ij}=0$ for all pixels in memory 203. Refer now to FIG. 7, which is a flow chart of the algorithm executed by controller 202 when a new frame is received. Initially, (i,j) is set to the first pixel of the array as shown at 210; however, the order in which the pixels are processed is not critical. The intensity, $C_{ij}$, of the current pixel is tested to be sure that the pixel has not been altered by an x-ray hit as shown at 211. If the measured intensity is less than $D_{max}$, the stored image pixel, $S_{ij}$, corresponding to that pixel is updated to include the current measurement as shown at 212. The counter $N_{ij}$ is also incremented by 1. If the measured intensity value is greater than $D_{max}$ for the current pixel, that pixel is ignored. Controller 202 then proceeds to the next pixel as shown at 213 and the process is repeated until all of the pixels have been processed for the current frame.

After all of the frames in the x-ray exposure have been processed, controller 202 generates a final x-ray image. Denote the pixels of the final image by $X_{ij}$. Some of the stored pixels have data from only a sub-set of the frames, since these pixels suffered x-ray hits in one or more of the frames. To correct for the lost data, controller 202 must normalize the stored image using the counter values. That is, $X_{ij}=N_{ij}*S_{ij}/N_f$, where $N_f$ is the number of frames that were taken.

The embodiments discussed above with reference to FIGS. 6 and 7 utilize a separate controller to store the cumulative image and update the image when each frame is received. Hence, there is still a significant amount of processing time required between frames, since each frame must be readout to the controller one row at a time. This processing time can be substantially reduced by utilizing a pixel design in which the image parameters $S_{ij}$ and $N_{ij}$ discussed above are stored within the pixels and are updated within each pixel at the end of each frame exposure period.

Figure 8:
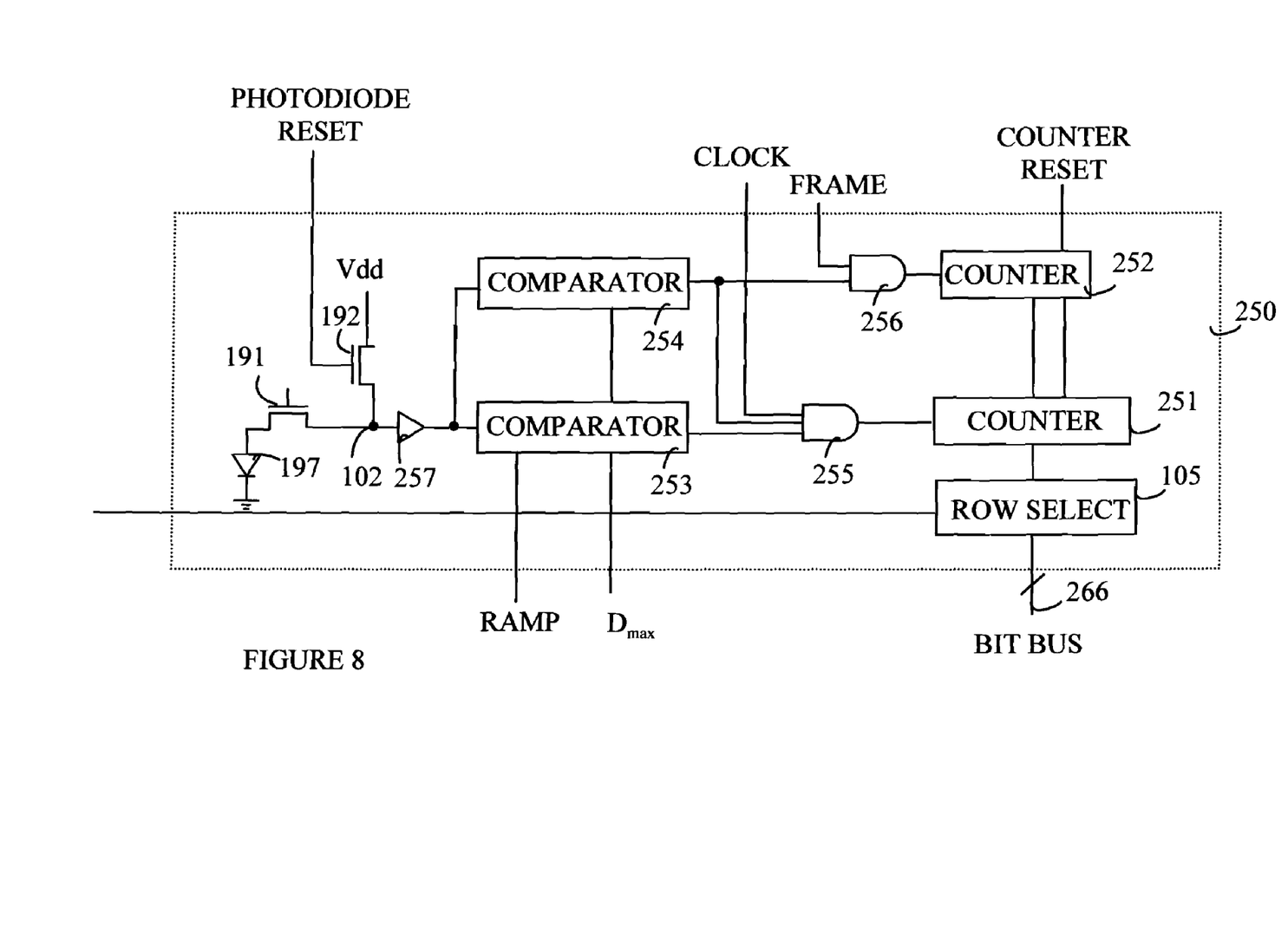
FIG. 8 illustrates a pixel of an imaging array according to another embodiment of the present invention.

Refer now to FIG. 8, which illustrates a pixel of an imaging array according to another embodiment of the present invention. Pixel 250 stores the cumulative image value for that pixel and updates the image value without requiring that the image be readout line by line. Pixel 250 includes an analog-to-digital converter that is analogous to that discussed above with reference to FIG. 5. Since all of the pixels are updated simultaneously, the entire frame is processed in a time equal to the time needed to process one row in the embodiments discussed with reference to FIGS. 6 and 7.

Pixel 250 includes two comparators 253 and 254 and two counters 251 and 252 that are reset at the beginning of the x-ray exposure. The comparators are used to test the magnitude of the signal generated by photodiode 197 since that photodiode was last reset against two signals. It should be noted that the signal on line 102 is a charge that was accumulated by photodiode 197 since the last time photodiode 197 was reset. In general, the comparators operate on voltage signals rather than currents. Hence, in one embodiment, an amplifier 257 that converts the charge on line 102 to a voltage that is then compared to the RAMP signal and $D_{max}$ by the comparators is used.

Counters 251 and 252 store counts that are analogous to $S_{ij}$ and $N_{ij}$ in the preceding discussion. The counters are updated if the signal generated by the photodiode is not outside the range that is expected for a pixel that has not been hit by an x-ray. If the pixel generates a signal that is greater than $D_{max}$, the counters are not updated and the data for the frame in question is ignored. At the end of the x-ray exposure, the data from counters 251 and 252 are readout on bit bus 266 to a controller that normalizes the data by dividing the contents of the counter 251 by the contents of counter 252.

The first comparator shown at 253 generates a logical 1 if the output of amplifier 257 is greater than the value specified by a ramp signal and less than the value specified by $D_{max}$. Hence, if the charge stored by photodiode 197 is within the expected range, the charge is digitized and added to the count already in counter 251. The output of comparator 254 is high when output 257 is smaller than $D_{max}$ and low when 257 is larger than $D_{max}$. Gate 255 blocks the clock signals as soon as the RAMP signal exceeds the output of amplifier 257; hence, the count in counter 251 is incremented by an amount that is proportional to the voltage at the output of amplifier 257. If the output of amplifier 257 is greater than that expected for a normal pixel receiving photons from the scintillator, no counts will be stored in counter 251, since the clock input to counter 251 will have been blocked by gate 255.

As noted above, counter 252 performs a function analogous to $N_{ij}$ in the embodiments discussed above. At the end of each frame readout, a frame signal is sent on the FRAME line. If the output of amplifier 257 is greater than that specified by $D_{max}$, comparator 254 blocks the frame signal from being counted by counter 252 by controlling gate 256. Otherwise, counter 252 is incremented by one.

After each frame has been digitized and the results added to the counters in those pixels having valid data, photodiode 197 is reset by applying an appropriate signal to transistor 192. If the photodiode had suffered an x-ray hit, the charge accumulated will be removed by the reset operation. Hence, the x-ray hit will have no impact on the maximum amount of charge that can be stored by the photodiode.

The above-described embodiments utilize a scheme in which the photodiodes are reset at the end of each frame. Alternatively, the photodiodes could be allowed to continue accumulating charge without reset from frame to frame, and the counter must be reset at the end of each frame. In that case, the value readout at the end of the frames is equivalent to a single image that would have been measured if the x-ray source had been turned off at the end of the frame in question. In this case, the counts in each pixel as a function of frame number follow curves similar to those shown in FIG. 4. To correct for x-ray hits, the location of an x-ray hit in the frame sequence must be detected and then the magnitude of the x-ray contribution to the pixel must be determined and subtracted from the pixel value that is measured at the end of the last frame.

The location of an x-ray hit in the data for a particular pixel can be ascertained in a manner analogous to that described above. Denote the output of the pixels as a function of frame number by $S_{ij}(f)$, where f is the frame number. If the pixel suffered a hit in frame k, if $S_{ij}(k)-S_{ij}(k-1)>D_{max}$, for k>1. If $S_{ij}(1)>D_{max}$, then the pixel suffered a hit in the first frame. Given that the location of the frame in which the hit occurred has been determined, the data on each side of the hit can be fit to a straight line to determine the slope of the line. The corrected pixel value can then be computed from the measured slope by multiplying the slope by the x-ray exposure time.

The above procedure assumes that the pixels that are hit by x-rays do not saturate. In general, there is some maximum charge that can be stored at the photodiode in each pixel. If an x-ray hit generates sufficient charge to saturate the pixel, the data that arrives after the x-ray hit cannot be stored, and hence, the determination of the corrected pixel signal must be made using only data that was recorded for that pixel before the x-ray hit. If the x-ray hit occurs late in the x-ray exposure, the early data may be sufficient to provide an acceptable estimate of the corrected pixel value. If the pixel saturates before sufficient data is obtained to estimate the correct pixel value, the pixel can be replaced by a pixel value obtained by interpolating neighboring pixels.

Correction schemes that reset the pixels after each frame do not suffer from this saturation problem. The data from the pixel that is hit is not used in determining the final pixel value; hence, even if the x-ray hit saturates the pixel, the correction scheme is not compromised. Furthermore, since the pixel is reset after each frame, the saturated condition is eliminated, and hence, data from that pixel in subsequent frames is not compromised. However, resetting the photodiodes after each frame is not without cost. The reset operation introduces noise into the measurements. If the charge from the available light from the scintillator is much greater than the reset noise, the reset noise is not a significant problem.

The x-ray exposure time is determined by the amount of light from the scintillator and the size of the photodiode within each pixel. The fraction of the pixel that is devoted to the photodiode depends on the amount of circuitry that must be included in each pixel in addition to the photodiode. Schemes that utilize pixel designs such as pixels 100 and 250 discussed above require that more area be set aside for the processing circuitry than schemes that utilize an analog-to-digital converter at the end of each column bit line. Hence, such systems require greater x-ray exposures. The x-ray exposure time can, however, be reduced by increasing the size of the pixels.

The size of each pixel is determined by the resolution in the x-ray image. Reducing the size of each pixel below some minimum size determined by the resolution in the optical image generated by the scintillator does not provide a significant improvement in the resolution of the image of the teeth. The resolution is determined by the scintillator and the distance between the teeth and the image sensor. In the case of a CMOS x-ray sensor, the optimum pixel size is of the order of 25 microns on a side. That is, providing a pixel array in which each pixel is smaller than this size and increasing the number of pixels to fill the image area does not result in a significantly better image. Of this pixel area, a small reduction of the photodiode area, i.e., less than 10 percent, will not affect the pixel signal integrity noticeably. This leaves a sufficient area of silicon to accommodate the additional circuitry required to implement the more complex pixels shown at 100 and 250 above while maintaining satisfactory x-ray exposure levels.

The above-described embodiments of the present invention utilize a single threshold value, $D_{max}$, to identify pixels in which the pixel sensor suffered an x-ray hit during a particular frame. If an x-ray hit on a pixel sensor generates a signal that is always significantly greater than the signal generated by the brightest pixels in which the corresponding pixel sensors did not suffer an x-ray hit in a frame, this strategy is sufficient.

Furthermore, even if the $D_{max}$ cutoff throws out part of the data for a particular pixel, the resulting x-ray image will still be useful for dental purposes. Consider the case in which $D_{max}$ is set at the average of the frame pixel values for a particular bright pixel in the absence of an x-ray hit. Since the frame pixel values are distributed about the average, the single $D_{max}$ filtering algorithm described above would result in all of the frame pixel values that were above the average being thrown out and all of the frame pixel values that were below the average being retained. The average of the retained values will correspond to a bright pixel whose brightness is somewhat below the correct value. That is, the image pixel value will be in error but the pixel will still be bright. It should be noted that the interesting regions of a dental x-ray are those regions of the image corresponding to the teeth, and the teeth absorb x-rays. Hence, the regions of interest are not in the bright portions of the image, and thus, small errors in the bright portion of the image are of little consequence.

The problem arises when $D_{max}$ results in all of the individual frame pixel values for a particular pixel being thrown out. In this case, a pixel in the final image that should have been white is converted to a black pixel. Such pixels can be easily identified since the frame counter for the pixel will have a value of 0 indicating that all of the data was thrown out. If the number of such pixels is small and the locations of the pixels are scattered, the values can be approximated by interpolating the neighboring pixels. However, if a large area of the x-ray is left as undefined, a more complex algorithm is needed.

In principle, this situation can be avoided by setting a different $D_{max}$ value for each pixel in the image. Bright pixels would be assigned a $D_{max}$ value that is higher than darker pixels in such a scheme. To simplify the following discussion, the data from a particular pixel sensor that is accumulated during one frame period will be referred to as the pixel frame value for that pixel. Refer again to FIG. 6. In one embodiment of the present invention, controller 202 stores the pixel frame values in memory 203 for each frame until the data for all of the frames has been accumulated. Controller 202 then generates a final image by selectively averaging the frame pixel values for each pixel to provide the value for that pixel in the final image. A number of different averaging algorithms could be utilized depending on the degree of accuracy required in the final image. To simplify the following discussion, it will be assumed that N frames of data are collected and averaged to provide the final image.

In one embodiment, controller 202 generates a pixel value in the final image by averaging the N-k frame pixel values having the smallest values for the corresponding pixel in each frame. Here, k is set to the maximum number of x-ray hits expected. Hence, data corresponding to x-ray hits is selectively excluded in frames in which the corresponding pixel had an x-ray hit. However, in pixels that did not have such a hit, the final pixel values will be somewhat skewed to smaller values. If k is small compared to N, the resulting errors are expected to be small.

In another embodiment, controller 202 again averages the N-k smallest frame pixel values for each pixel and also computes the standard deviation of the frame pixel values about this average. A $D_{max}$ value is then set for the pixel in question based on the average and standard deviation. For example, $D_{max}$ could be set to the average plus 3 standard deviations. Given this $D_{max}$ value, controller 202 then computes the average of all of the frame pixel values that are below $D_{max}$ for the pixel in question to obtain the pixel value for that pixel in the final image.

In yet another embodiment, controller 202 merely uses two preset $D_{max}$ values rather than computing an individual $D_{max}$ value for each pixel. The controller starts by using the first $D_{max}$ value, which is the smaller of the two values. If all of the frame pixel data values for the pixel in question are above this $D_{max}$ value, the controller switches to the second, higher, $D_{max}$ value. Having selected the appropriate $D_{max}$ value, the controller averages all of the frame pixel values that are below $D_{max}$ for the pixel in question.

The above variable $D_{max}$ algorithms can be easily implemented in embodiments that utilize a memory and controller that are external to the imaging array. However, with the exception of the embodiments that use preset $D_{max}$ values, the corresponding algorithms are not easily implemented in a pixel level processor of the type discussed above with reference to FIG. 8.

Figure 9:
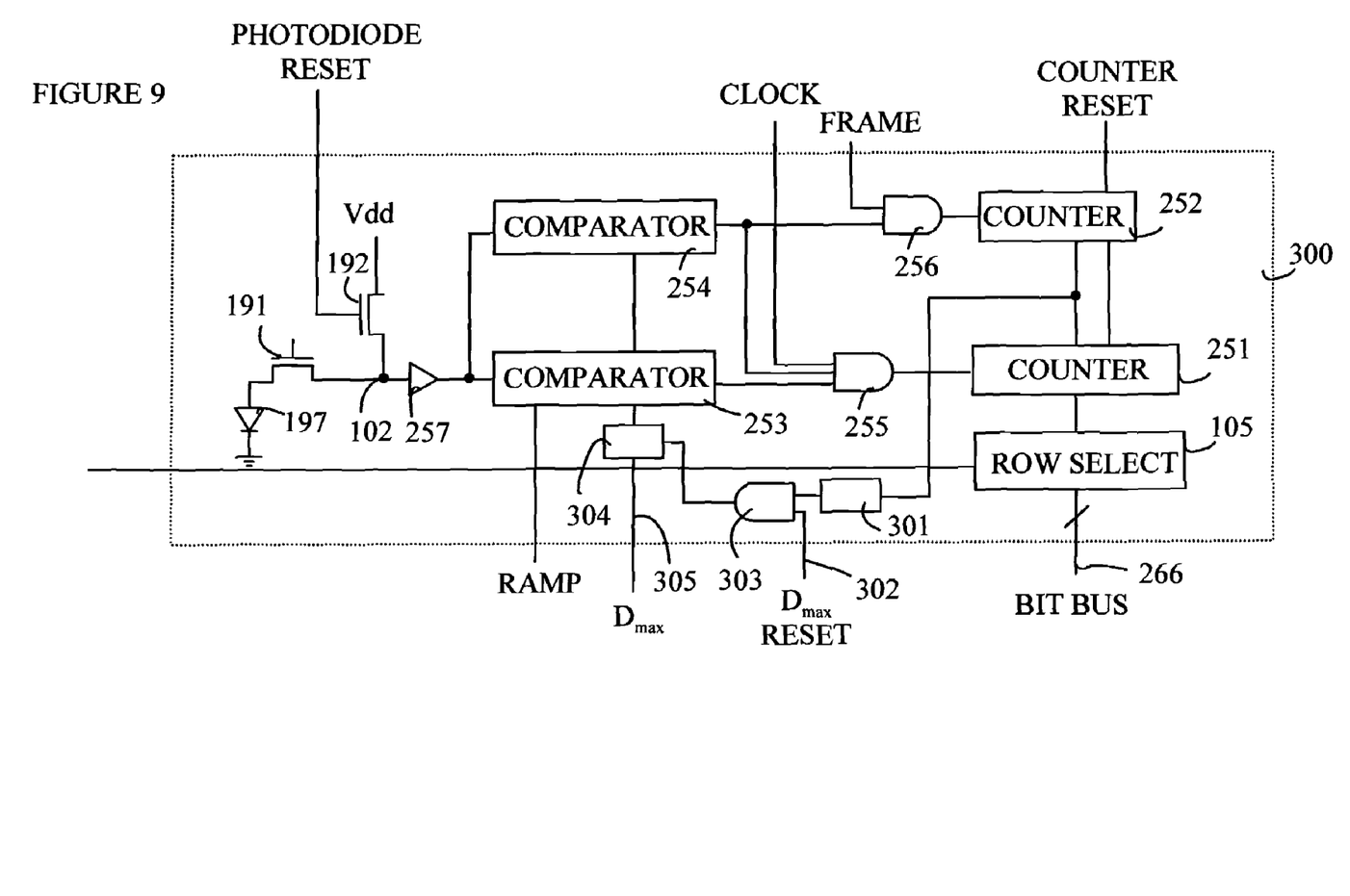
FIG. 9 illustrates a pixel of an imaging array according to another embodiment of the present invention.

Refer now to FIG. 9, which illustrates a pixel of an imaging array according to another embodiment of the present invention. Pixel 300 is similar to pixel 250 discussed above in that counter 251 stores a running sum of the intensities of the individual frame values that were below some cut-off threshold $D_{max}$, and counter 252 stores the number of frames in which an intensity below $D_{max}$ was obtained and added into the sum in counter 251. Pixel 300 utilizes the $D_{max}$ value that is stored in an analog hold circuit 304. This value is loaded from a $D_{max}$ line 305 when a $D_{max}$ reset signal is present on line 302 and the contents of counter 252 are equal to 0. A logic circuit 301 generates a high signal when counter 252 contains 0.

In an image sensor that utilizes pixels such as pixel 300, the counter reset line is asserted at the beginning of the imaging process. This resets both counter 252 and counter 251. The smallest of the preset $D_{max}$ values is then placed on line 305 and the $D_{max}$ rest signal is asserted on line 302, which causes this value of $D_{max}$ to be stored in hold circuit 304. Data is then taken for a first number of frames in a manner analogous to that described above. At the end of each frame, the data value from amplifier 257 is tested against $D_{max}$ and the data is digitized and stored and added to the value stored in counter 251 if the data value was less than $D_{max}$. If the data value was less than $D_{max}$, the value in counter 252 is incremented.

At the end of the first number of frames, a larger $D_{max}$ value is placed on line 305 and the $D_{max}$ reset line is asserted. In each pixel in which no data was accumulated in the first number of frames, the new $D_{max}$ value will be stored in hold circuit 304. The accumulation of data then proceeds for a second number of frames. The data accumulation process could then be terminated and the data readout. Alternatively, a still smaller $D_{max}$ value could be placed on the $D_{max}$ line and the process repeated for a third number of frames, and so on.

In this embodiment, the bright pixels that have valid values above $D_{max}$ eventually are provided with a $D_{max}$ value that is high enough to allow those pixels to store data. The final average based on those pixels will include data from a smaller number of frames. However, the pixel values in question have much higher frame data values, and hence, fewer frame values are needed to provide a pixel value with sufficient statistical accuracy in the final image.

The embodiments of the present invention described above utilize a photodiode to convert the light incident on each pixel to a charge. However, other forms of photosensor such as a phototransistor could be utilized.

Various modifications to the present invention will become apparent to those skilled in the art from the foregoing description and accompanying drawings. Accordingly, the present invention is to be limited solely by the scope of the following claims.

What is claimed is:

1. An image sensor comprising:
a two-dimensional array of pixel sensors;
a layer of scintillation material adjacent to said two-dimensional array, said scintillation material emitting light in response to x-rays impinging thereon, said light being detected by said pixel sensors; and
a controller that reads out data stored in said two-dimensional array of pixel sensors and forms an image comprising a two-dimensional array of pixels therefrom, said controller correcting that data for errors resulting from x-rays that generate electrons that are stored in said pixel sensors in the process of forming said image;
wherein each of said pixel sensors comprises a photodetector that stores a charge in response to said light being received by that photodetector during a preceding time period; and
wherein said controller forms said image by causing said array of pixel sensors to form a plurality of frames, each frame comprising an array of measurements determined by said charges stored by said pixel sensors during a corresponding preceding time period; and
wherein said image comprises, for each pixel, a sum of said measurements corresponding to said charges stored by a corresponding one of said pixel sensors in at least two frames of said plurality of frames, said measurements having values less than a predetermined threshold value for each pixel sensor.

2. The image sensor of claim 1 wherein each of said pixel sensors further comprises a reset circuit, and an interface that connects that pixel sensor to said controller in response to commands generated by said controller, said reset circuit resetting said photodetector by causing a predetermined potential to be coupled to said photodetector.

3. The image sensor of claim 2, wherein said controller causes said reset circuits to reset said photodetectors at the end of each of said frames.

4. The image sensor of claim 1 wherein said controller identifies pixel sensors in which said stored charge is greater than said threshold value.

5. The image sensor of claim 4 wherein said controller combines data from a plurality of frames for each pixel sensor to determine a corresponding pixel in said image and wherein said controller does not combine data from said identified pixel sensors in forming said image.

6. An image sensor comprising:
a two-dimensional array of pixel sensors;
a layer of scintillation material adjacent to said two-dimensional array, said scintillation material emitting light in response to x-rays impinging thereon, said light being detected by said pixel sensors; and
a controller that reads out data stored in said two-dimensional array of pixel sensors and forms an image comprising a two-dimensional array of pixels therefrom, said controller correcting that data for errors resulting from x-rays that generate electrons that are stored in said pixel sensors in the process of forming said image, wherein said controller forms said image by causing said two-dimensional array of pixel sensors to form a plurality of frames, each frame comprising a measurement of a charge stored by each pixel sensor during a preceding time period, said controller combining data from said plurality of frames to form said image;

wherein said controller identifies pixel sensors in which said stored charge is greater than a threshold value; and wherein said threshold value is different for different ones of said pixel sensors.

7. An image sensor comprising:

a two-dimensional array of pixel sensors;

a layer of scintillation material adjacent to said two-dimensional array, said scintillation material emitting light in response to x-rays impinging thereon, said light being detected by said pixel sensors;

a controller that reads out data stored in said two-dimensional array of pixel sensors and forms an image comprising a two-dimensional array of pixels therefrom, said controller correcting that data for errors resulting from x-rays that generate electrons that are stored in said pixel sensors in the process of forming said image, wherein each pixel sensor further comprises:

a comparator that compares a signal voltage generated by said photodetector in said pixel with a reference voltage, said comparator generating a stop signal when said signal voltage is in a predetermined relationship with said reference voltage; and a first counter that counts pulses from a clock input until said stop signal is generated, said first counter storing a digital count value.

8. The image sensor of claim 7 wherein said first counter is blocked from counting if said signal voltage is greater than a threshold voltage.

9. The image sensor of claim 8 wherein each pixel sensor further comprises a second counter that is incremented by a frame signal, said second counter being blocked from incrementing on said frame signal if said signal voltage is greater than said threshold voltage.

10. The image sensor of claim 9 wherein each pixel sensor further comprises a memory for storing said threshold voltage.

11. The image sensor of claim 10 wherein said memory stores a voltage on a conductor connected to said memory in response to a threshold reset signal and a determination that said second counter is set to zero.

* * * * *